United States Patent
Mino et al.

(10) Patent No.: US 8,421,900 B2
(45) Date of Patent: *Apr. 16, 2013

(54) IMAGE CAPTURING APPARATUS, AN IMAGE CAPTURING METHOD AND A MACHINE READABLE MEDIUM STORING THEREON A COMPUTER PROGRAM FOR CAPTURING AN IMAGE OF A RANGE WIDER THAN AN IMAGE CAPTURE DESIGNATION RANGE

(75) Inventors: Kazuhiro Mino, Kanagawa (JP); Makoto Yonaha, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 13/022,230

(22) Filed: Feb. 7, 2011

(65) Prior Publication Data

US 2011/0122295 A1  May 26, 2011

Related U.S. Application Data

(62) Division of application No. 11/220,613, filed on Sep. 8, 2005, now Pat. No. 7,903,164.

(30) Foreign Application Priority Data

Jun. 24, 2005  (JP) ................................. 2005-184412

(51) Int. Cl.
*H04N 5/222* (2006.01)
*H04N 5/228* (2006.01)

(52) U.S. Cl.
USPC .................................. 348/333.03; 348/222.1

(58) Field of Classification Search ............. 348/333.02, 348/333.03, 333.11, 321.3, 208.13, 208.14, 348/333.05
See application file for complete search history.

(56) References Cited

U.S. PATENT DOCUMENTS

| | | | | |
|---|---|---|---|---|
| 5,990,900 A | * | 11/1999 | Seago | 345/427 |
| 6,124,859 A | * | 9/2000 | Horii et al. | 345/427 |
| 7,129,981 B2 | | 10/2006 | Berstis | |
| 7,551,203 B2 | | 6/2009 | Nakayama et al. | |
| 7,612,800 B2 | * | 11/2009 | Okada et al. | 348/169 |
| 2001/0013902 A1 | | 8/2001 | Kawabe | |
| 2002/0036692 A1 | * | 3/2002 | Okada | 348/208 |
| 2003/0117516 A1 | | 6/2003 | Ishida et al. | |
| 2004/0075750 A1 | | 4/2004 | Bateman | |
| 2004/0078805 A1 | | 4/2004 | Brian et al. | |
| 2004/0145668 A1 | | 7/2004 | Iwasawa et al. | |

(Continued)

FOREIGN PATENT DOCUMENTS

| JP | 2000295577 A | | 10/2000 |
|---|---|---|---|
| JP | 2003179915 | * | 6/2003 |

*Primary Examiner* — Albert Cutler
(74) *Attorney, Agent, or Firm* — Sughrue Mion, PLLC

(57) ABSTRACT

It is an object to provide an image of a desired composition in case the user is unsatisfied with the composition of an image already captured.

An image capturing apparatus for capturing an image is provided, wherein the apparatus includes an image capturing designation range acquiring unit for acquiring an image capturing designation range designated by a user; an image capturing unit for capturing an image of a range wider than the image capturing designation range; a storing unit for storing information indicative of the image capturing designation range corresponding to the captured image; and an image displaying unit for displaying at least an image within the image capturing designation range out of the captured image by making the user recognize the image capturing designation range.

5 Claims, 9 Drawing Sheets

U.S. PATENT DOCUMENTS

| | | |
|---|---|---|
| 2005/0128312 A1 | 6/2005 | Fredlund et al. |
| 2005/0140800 A1 | 6/2005 | Jeon et al. |
| 2005/0189471 A1* | 9/2005 | Nagasawa ................. 250/208.1 |
| 2005/0212931 A1* | 9/2005 | Gallagher et al. ............ 348/239 |
| 2005/0225650 A1 | 10/2005 | Hayashi et al. |
| 2005/0232459 A1 | 10/2005 | Rowe et al. |
| 2005/0232468 A1* | 10/2005 | Ono ............................. 382/104 |

* cited by examiner

IMAGE CAPTURING APPARATUS, AN IMAGE CAPTURING METHOD AND A MACHINE READABLE MEDIUM STORING THEREON A COMPUTER PROGRAM FOR CAPTURING AN IMAGE OF A RANGE WIDER THAN AN IMAGE CAPTURE DESIGNATION RANGE

CROSS REFERENCE TO THE RELATED APPLICATION

The present application is a Divisional of U.S. application Ser. No. 11/220,613, filed on Sep. 8, 2005, which claims priority from a Japanese Patent Application No. JP 2005-184412 filed on Jun. 24, 2005, the contents of which are incorporated herein by reference.

FIELD OF THE INVENTION

The present invention relates to an image capturing apparatus, an image capturing method and a machine readable medium storing thereon a computer program for capturing an image. More particularly, the present invention relates to an image capturing apparatus for capturing an image, an image capturing method for capturing an image and a machine readable medium storing thereon a computer program for capturing an image.

DESCRIPTION OF THE RELATED ART

Conventionally, a digital camera records data of a captured digital image on a recording medium using a nonvolatile memory, such as a flash memory. Recently, as the recording capacity of the recording medium used in the digital camera is increased, a user can record more images or higher quality images than before.

Thus, it is disclosed that an image capturing apparatus which can provide better quality image even after the image has been captured at the quality level designated by the user when the user wants to enhance the quality of captured image because he/she thinks the image was very well composed as disclosed, for example, in Japanese Patent Application Laid-open No. 2000-295577.

SUMMARY OF THE INVENTION

It is also frequent for a general user to be unsatisfied with the composition of a captured image, saying "it should have been better to shift the image to the right a little bit . . . ", because it is not so easy for her to take a good composition every time when she captures an image. The conventional image capturing apparatus disclosed in the above Japanese patent application may provide a solution to the user who is unsatisfied with the poor quality of the well-composed image, but does not provide any solution to a user who is unsatisfied with the composition of the captured image.

Therefore, it is an object of the present invention to provide an image capturing apparatus, an image capturing method and a machine readable medium storing thereon a computer program for capturing an image, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an image capturing apparatus for capturing an image includes: an image capturing designation range acquiring unit for acquiring an image capturing designation range designated by a user; an image capturing unit for capturing an image of a range wider than the image capturing designation range; a storing unit for storing information indicative of the image capturing designation range corresponding to the captured image; and an image displaying unit for displaying at least an image within the image capturing designation range out of the captured image by making the user recognize the image capturing designation range.

The image capturing apparatus may further include: an image processing unit for performing an image processing on the captured image in order to make an amount of data of the portion of the image outside of the image capturing designation range be less than that of the portion of the image within the image capturing designation range out of the captured image. The image processing unit may convert the portion of the image outside of the image capturing designation range into an image of a resolution lower than that of the portion of the image within the image capturing designation range out of the captured image. The image processing unit may compress the portion of the image outside of the image capturing designation range at a compression rate higher than that for the portion of the image within the image capturing designation range out of the captured image. Further, the image processing unit may perform an image enhancing process on the portion of the image within the image capturing designation range at a level higher than that for the portion of the image outside of the image capturing designation range out of the captured image. Furthermore, the image capturing apparatus may capture a moving picture, the image capturing unit may capture an image wider than the image capturing designation range as the captured image which is a frame of the moving picture, and the image processing unit may remove more frequency components from image signals of the portion of the image outside the image capturing designation range than those of the portion of the image within the image capturing designation range.

The image capturing apparatus may further include: a remaining capacity detecting unit for detecting remaining capacity of the storing unit; and an image removing unit for removing a portion of the image outside of the image capturing designation range corresponding to that captured image stored in the storing unit in case the remaining capacity detected by the remaining capacity detecting unit. The image capturing apparatus may further include: a remaining capacity displaying unit for displaying a capacity calculated by adding the remaining capacity detected by the remaining capacity detecting unit to the capacity occupied by the portion of the image outside of the image capturing designation range corresponding to that captured image stored in the storing unit, as a current remaining capacity. The image capturing apparatus may further include: an ideal composition detecting unit for detecting an ideal composition range in which the captured image is ideally composed, wherein the image processing unit may perform an image processing on the captured image to make the amount of data of the portion of the image outside of either of the image capturing designation range or the ideal composition range to be less than that of the portion of the image within at least one of the image capturing designation range and the ideal composition range, and the storing unit may store information indicative of the ideal composition range further corresponding to the captured image.

The ideal composition range detecting unit may detect the ideal composition range on the basis of the direction to which a face of a person in the captured image. Further, the ideal composition range detecting unit may detect the ideal composition range in order that a background area of the captured image in the direction to which the face of the person in the captured image is facing is wider than another background area in the opposite direction. Further, the ideal composition range detecting unit may detect the ideal composition range on the basis of the direction to which an object is moving in the captured image. Further, the ideal composition range detecting unit may detect the ideal composition range in order that a background area of the captured image in the direction to which the object is moving in the captured image is wider than another background area in the opposite direction. Further, the ideal composition range detecting unit acquires a position of a vanishing point in the captured image and detects the ideal composition range to comprise at least a portion of the image capturing designation range and the position of the vanishing point. Here, the ideal composition range detecting unit may detect an area acquired by expanding the image capturing designation range to comprise the vanishing point in the direction to the vanishing point as the ideal composition range in case the vanishing point is outside of the image capturing designation range.

Further, the ideal composition range detecting unit may detect a portion of the image capturing designation range to comprise a triangular area formed by the contour of the object, which has the vanishing point as one of it's apex, as the ideal composition range in case the vanishing point is outside of the image capturing designation range. The image capturing apparatus may further include: an ideal composition detecting unit for detecting an ideal composition range in which the captured image is ideally composed, wherein the image processing unit may perform an image processing on the captured image to enhancing the quality of the portion of the image within the image capturing designation range and the ideal composition range at a level higher than that for the portion of the image outside of either of the image capturing designation range or the ideal composition range, and the storing unit may store information indicative of the ideal composition range further corresponding to the captured image.

According to the second aspect of the present invention, an image capturing method for capturing an image includes: an image capturing designation range acquiring step of acquiring an image capturing designation range designated by a user; an image capturing step of capturing an image of a range wider than the image capturing designation range; a storing step of storing information indicative of the image capturing designation range corresponding to the captured image; and an image displaying step of displaying at least an image within the image capturing designation range out of the captured image by making the user recognize the image capturing designation range.

According to the third aspect of the present invention, a machine readable medium storing thereon a computer program, the computer program making an image capturing apparatus functions as: an image capturing designation range acquiring unit for acquiring an image capturing designation range designated by a user; an image capturing unit for capturing an image of a range wider than the image capturing designation range; a storing unit for storing information indicative of the image capturing designation range corresponding to the captured image; and an image displaying unit for displaying at least an image within the image capturing designation range out of the captured image by making the user recognize the image capturing designation range.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

According to the present invention, it is possible to provide an image of a desired composition in case the user is unsatisfied with the composition of an image already captured.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
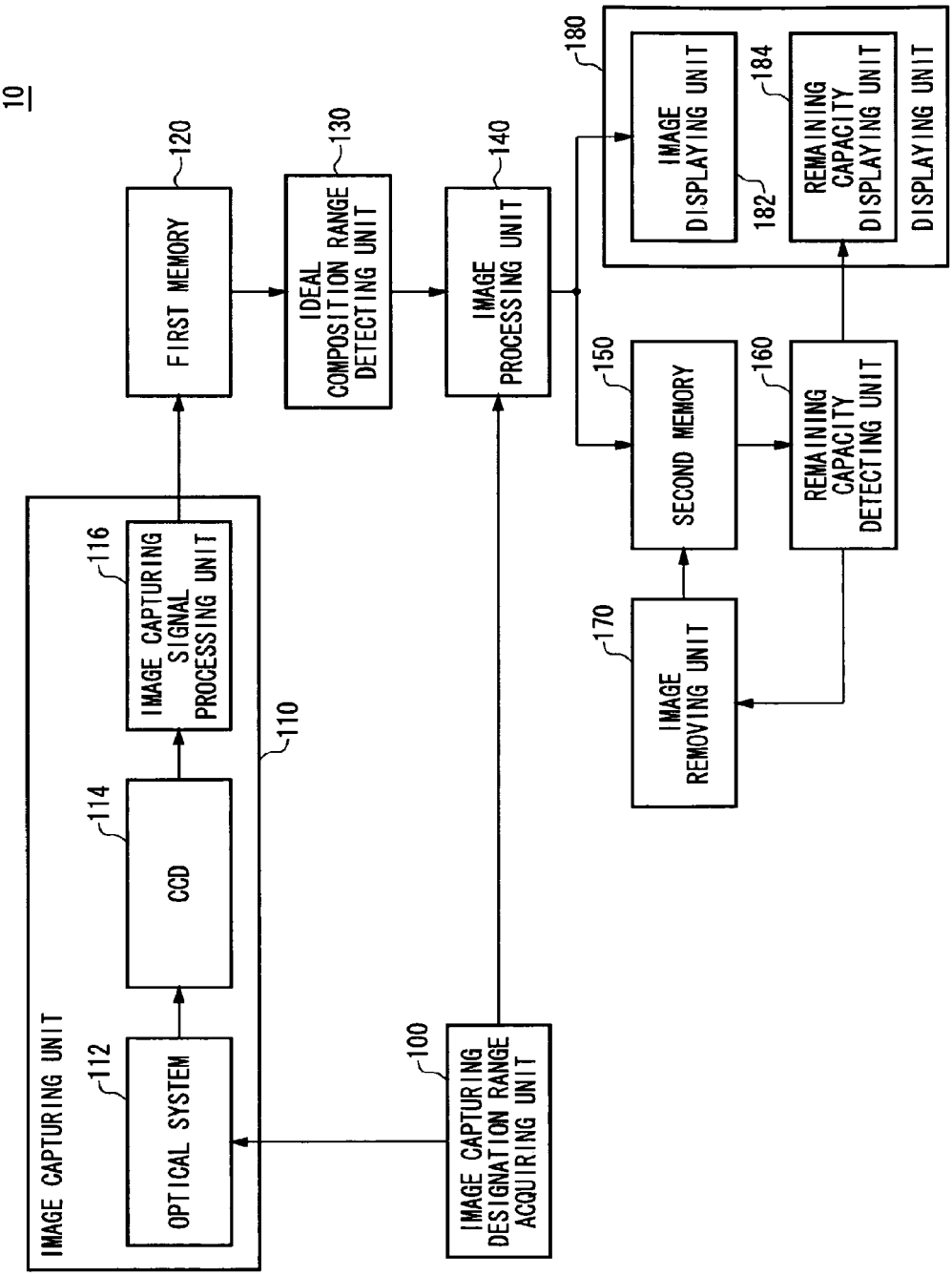
FIG. 1 shows a block diagram of an image capturing apparatus 10.

FIG. 1 shows a block diagram of an image capturing apparatus 10 according to an embodiment of the present invention. The image capturing apparatus 10 is, for example, a digital camera and captures an image. The image capturing apparatus 10 may be a digital still camera for capturing a still image, and may be a digital video camera for capturing a moving picture.

It is an object of the image capturing apparatus 10 according to the present embodiment to let a user perform an editing operation on a captured image, such as changing the trimming range, by capturing and storing an image wider than a range designated by the user for capturing the image in case the user is unsatisfied with the captured image in regard to the composition of the captured image.

The image capturing apparatus 10 includes an image capturing designation range acquiring unit 100, an image capturing unit 110, a first memory 120, an ideal composition range detecting unit 130, an image processing unit 140, a second memory 150, a remaining capacity detecting unit 160, an image removing unit 170 and a displaying unit 180. The image capturing designation range acquiring unit 100 acquires an image capturing designation range, which is a range in which the user designates to capture an image, and outputs information indicating the image capturing designation range, such as end points, to the image capturing unit 110 and the image processing unit 140.

The image capturing unit 110 includes an optical system 112, a CCD 114 and an image capturing signal processing unit 116 and captures an image. Here, the image capturing unit 110 captures an image wider than the image capturing designation range received from the image capturing designation range acquiring unit 100. The image capturing unit 110 outputs the captured image to the first memory 120. The optical system 112 includes a zoom lens, for example, and forms an image of an object on the light receiving surface of the CCD. Here, it is preferable for the optical system 112 to be able to control the image capturing magnification of the zoom lens in order to form an image wider than the image capturing designation range received from the image capturing designation range acquiring unit. The CCD 114 include a plurality of light receiving elements, and outputs accumulated electrical charges in the light receiving elements according to the optical image of the object formed by the optical system 112 as analog electrical signals to the image capturing signal processing unit 116. The image capturing signal processing unit 116 decomposes the analog electrical signals indicating the optical image of the object received from the CCD 114 into R, G and B components. The image capturing signal processing unit 116 converts the decomposed R, G and B analog signal components into digital signals, and outputs digital image data indicating the resulting object image to the first memory 120. The first memory 120 is a volatile memory, such as a DRAM, and stores the image data indicating the captured image received from the image capturing signal processing unit 116.

The ideal composition range detecting unit 130 detects the ideal composition range, in which the captured image is ideally composed, from the image captured by the image capturing unit 110 and stored in the first memory 120. The ideal composition range detecting unit 130 outputs the captured image and information indicating the ideal composition range such as end points to the image processing unit 140. The image processing unit 140 performs an image processing on the captured image received from the ideal composition range detecting unit 130. Here, the image processing may means image compression according to JPEG (Joint Photographic Experts Group) format, or converting the image signals of the captured image into NTSC or PAL video signals. The image processing unit 140 may perform the image processing on the basis of the image capturing designation range received from the image capturing designation range acquiring unit 100 and the ideal composition range received from the ideal composition range detecting unit 130. Specifically, the image processing unit 140 may perform an image processing on the captured image in order to make an amount of data of the portion of the image outside of either of the image capturing designation range or the ideal composition range be less than that of the portion of the image within at least one of the image capturing designation range and the ideal composition range out of the captured image.

Further, the image processing unit 140 may perform AE, AWB, color processing, hue processing, contrast processing or sharpness processing, etc. on the captured image to enhancing the quality of the portion of the image within the image capturing designation range and the ideal composition range. For example, the image processing unit 140 may perform the image processing to enhance sharpness of the portion of the image within the image capturing designation range at a higher level than that for the portion of the image outside of the image capturing designation range. For example, the image processing unit 140 may perform the image processing to enhance contrast of the portion of the image within the image capturing designation range at a higher level than that for the portion of the image outside of the image capturing designation range. For example, the image processing unit 140 may perform the image processing to enhance hue of the portion of the image within the image capturing designation range at a higher level than that for the portion of the image outside of the image capturing designation range Each AE, AWB, color processing, hue processing, contrast processing or sharpness processing is an example of a setup process.

The image processing unit 140 may perform the setup processing on the portions both within and outside of the image capturing designation range and the ideal composition range. In the related case, the image processing unit 140 may perform the setup processing, such as AE, AWB, color processing, hue processing, contrast processing or sharpness processing, etc., on the portion of the image within the image capturing designation range and the ideal composition range at a high level in order to enhance the quality of the portion of the image within the image capturing designation range and the ideal composition range better than the portion of the image outside of the image capturing designation range and the ideal composition range.

The image processing unit 140 may enhance the quality of the portion of the image within the image capturing designation range and the ideal composition range better than the portion of the image outside of the image capturing designation range and the ideal composition range by omitting a part of the setup processing on the portion of the image outside of the image capturing designation range and the ideal composition range. For example, the image processing unit 140 may perform the setup processing by performing all of the AE, AWB, color processing, hue processing, contrast processing and sharpness processing, etc. on the portion of the image within the image capturing designation range and the ideal composition range and performing one processing selected out of the AE, AWB, color processing, hue processing, contrast processing and sharpness processing, etc. on the portion of the image outside of the image capturing designation range and the ideal composition range. The image processing unit 140 may omit at least some of the image processing included in the setup processing on the portion of the image outside of the image capturing designation range and the ideal composition range. The image processing unit 140 outputs the captured image, on which the image processing is performed, and the information indicating the image capturing designation range and the ideal composition range to the second memory 150 and the displaying unit 180.

The second memory 150 is a nonvolatile memory, such as a flash memory, and stores the captured image received from the image processing unit 140. The second memory 150 further stores information respectively indicating the image capturing designation range and the ideal composition range corresponding to the captured image. The second memory 150 is an example of the storing unit of the present invention. The remaining capacity detecting unit 160 detects the remaining capacity of the second memory 150 and outputs information indicating the detected remaining capacity of the second memory 150 to the image removing unit 170 and the displaying unit 180. The remaining capacity detecting unit 160 detects the capacity occupied by the portion of the image outside of either of the image capturing designation range or the ideal composition range corresponding to the captured image stored in the second memory 150, and outputs information indicating the detected capacity to the displaying unit 180. The image removing unit 170 receives the information indicating the remaining capacity of the second memory 150 from the remaining capacity detecting unit 160. The image removing unit 170 removes the portion of the image outside of either of the image capturing designation range or the ideal composition range out of the captured image stored in the second memory 150 in case the remaining capacity of the second memory 150 is less than a predetermined reference value.

The displaying unit 180 is an electronic view finder using for example an LCD panel, and includes an image displaying unit 182 and a remaining capacity displaying unit 184. The image displaying unit 182 receives the captured image and the information indicating the image capturing designation range from the image processing unit 140. The image displaying unit 182 displays at least a portion of the captured image within the image capturing designation range by making the user recognize the image capturing designation range. The remaining capacity displaying unit 184 displays a capacity calculated by adding the remaining capacity of the second memory 150 detected by the remaining capacity detecting unit 160 to the capacity occupied by the portion of the image outside of either of the image capturing designation range or the ideal composition range corresponding to that captured image stored in the second memory 150, as a current remaining capacity of the second memory 150.

According to the image capturing apparatus of the present embodiment of the present invention, it is possible to capture and store an image wider than the image capturing designation range designated by the user when capturing an image. The user can get another image of a different composition by performing a composition trimming on the captured image in a wider range than the image capturing designation range when the user feels that a better image should have been captured if the image had been differently composed even after capturing the image.

Further, recently, even though the number of pixels of a CCD used in a digital camera is increased drastically, it is quite general that a resolution of an image used by the user is low in comparison with the number of pixels of the CCD due to an image retention environment and/or a reference environment. In other words, there is a case where the increase in the number of pixels of the CCD compared to the conventional image capturing apparatus does not turn to the user's advantage. On the other hand, the image capturing apparatus 10 according to the present embodiment of the present invention, the image capturing unit 100 captures and stores an image wider than the image capturing designation range designated by a user. Here, the portion of the captured image within the image capturing designation range has a lower resolution than that of the image captured by controlling the zooming ratio for the portion of the image within the image capturing designation range to be formed on the entire light receiving surface of the CCD. However, since the number of pixels of the CCD 114 is drastically increased, it is possible to capture the portion of the image within the image capturing designation range with a high enough resolution even when the captured image has wider range according to the image capturing apparatus 10. In other words, it is possible to use the whole pixels of the CCD 114 efficiently.

Further, the image capturing apparatus 10 according to the present embodiment of the present invention is not limited to have the only structure shown in FIG. 1, but may have a structure modified by adding various changes to the structure shown in FIG. 1. For example, the image capturing apparatus 10 may not include the ideal composition range detecting unit 130. In this case, each of the image processing unit 140, the second memory 150, the remaining capacity detecting unit 160, the image removing unit 170 and the remaining capacity displaying unit 184 may function without relation to the ideal composition range. Specifically, the image processing unit 140 may perform an image processing on the captured image in order to make an amount of data of the portion of the image outside of the image capturing designation range be less than that of the portion of the image within the image capturing designation range out of the captured image. The second memory 150 may store the information indicating the image capturing designation range corresponding to the captured image. The remaining capacity detecting unit 160 may detect the capacity occupied by the portion of the image outside of the image capturing designation range corresponding to the captured image stored in the second memory 150. The image removing unit 170 may remove the portion of the image outside of the image capturing designation range corresponding to the captured image stored in the second memory 150 in case the remaining capacity of the second memory 150 is less than the predetermined reference value. Further, the remaining capacity displaying unit 184 may display a capacity calculated by adding the remaining capacity of the second memory 150 detected by the remaining capacity detecting unit 160 to the capacity occupied by the portion of the image outside of the image capturing designation range corresponding to that captured image stored in the second memory 150, as a current remaining capacity of the second memory 150.

Figure 2:
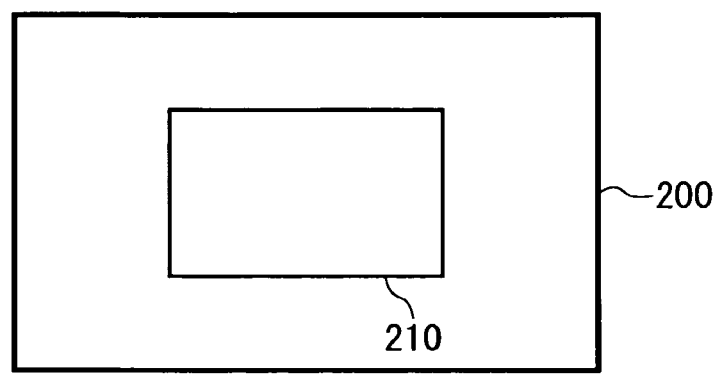
FIG. 2 shows a first example of a captured image 200 according to an embodiment of the present invention.

FIG. 2 shows a first example of a captured image 200 according to an embodiment of the present invention. According to the present embodiment, the image capturing unit 110 captures the image 200 wider than the image capturing designation range 210 acquired by the image capturing designation range 100. The image processing unit 140 performs an image processing on the basis of the image capturing designation range on the captured image 200. For example, the image processing unit 140 may convert the portion of the image outside of the image capturing designation range 210 of the captured image 200 into an image of a lower resolution than that for the portion of the image within the image capturing designation range 210. For another example, the image processing unit 140 may perform an image compression processing on the portion of the image outside of the image capturing designation range 210 of the captured image 200 at a higher rate than that for the portion of the image within the image capturing designation range 210. Specifically, the image processing unit 140 may perform the image compression processing on the portion of the image outside of the image capturing designation range 210 of the captured image 200 with a larger quantization parameter than that for the portion of the image within the image capturing designation range 210. Further, 'the higher compression rate' means 'the less data amount of the image after the compression process'.

It is described hereinafter that the image capturing apparatus 10 is an image capturing apparatus for capturing a moving picture, such as a digital video camera. In this case, the image capturing unit 100 captures the captured image 200 wider than the image capturing designation range as a frame of the moving picture. Further, the image processing unit 140 may decrease the amount of data of the portion of the image outside of the image capturing designation range 210 by removing more high frequency components from the image signals indicating the portion of the image outside of the image capturing designation range 210 than from those indicating the portion of the image within the image capturing designation range 210 out of the image signals indicating the captured image 200.

According to the image capturing apparatus 10 of the present embodiment, it is possible to use a limited storing capacity of the second memory 150 because it is possible to make the portion of the image outside of the image capturing designation range be an image of relatively small amount of data by controlling the resolution and/or the compression rate. Further, in case the image capturing unit 10 captures and stores a still image, there are cases where the image quality varies across the image capturing designation range due to the resolution and/or the compression rate. However, in general, when the image capturing apparatus 10 captures a moving picture, even though there are differences in the quantity of removing the high frequency components across the image capturing designation range, it is difficult for the user to recognize the difference during watching the captured moving picture, so, generally, it does not make a big problem. In other words, in this case, it is possible to store a moving picture by using the storing capacity of the second memory efficiently without deteriorating the quality of the portion of the image outside of the image capturing designation range.

Figure 3:
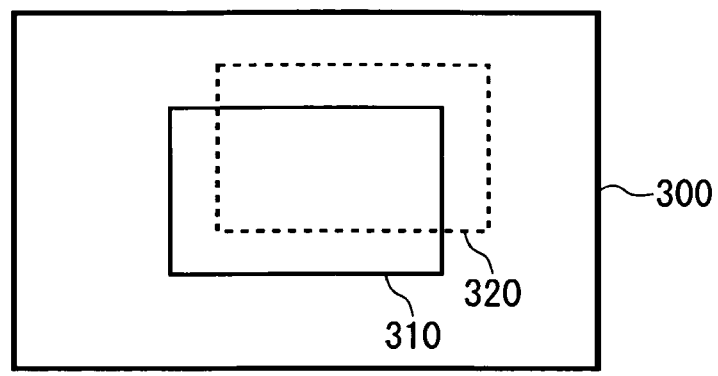
FIG. 3 shows a second example of the captured image 300 according to an embodiment of the present invention.

FIG. 3 shows a second example of the captured image 300 according to an embodiment of the present invention. According to the present embodiment, the image capturing unit 110 captures an image wider than the image capturing designation range 310 acquired by the image capturing designation range acquiring unit 100. The ideal composition range detecting unit 130 detects an ideal composition range 320, in which the captured image is ideally composed, out of the captured image 300. For example, the ideal composition range detecting unit 130 first extracts a contour of an object in the captured image 300 by performing an edge extraction processing on the captured image 300. Then, the ideal composition range detecting unit 130 detects a main object out of the object(s) from which the contour(s) is(are) extracted. For example, the ideal composition range detecting unit 130 recognizes an object of relatively more skin color than other object(s) as a human and detects that object as the main object by detecting color distribution(s) of the object(s) of which contour(s) is(are) extracted in the captured image 300. Then, the ideal composition range detecting unit 130 determines and detects an ideal composition range 320 in which the detected main object is of an optimal position and size. Here, the ideal composition range detecting unit 130 may detect the ideal composition range on the basis of the position of the main object according to a generally accepted method for determining a well-composed image, such as a tripartite method. Further, for example, the ideal composition range detecting unit 130 may detects the ideal composition range 320 on the basis of information indicating the ideal composition including the position and size of the main object and the ratio of the size of the main object to the size of the ideal composition range 320.

The image processing unit 140 performs on the basis of the image capturing designation range 310 and the ideal composition range 320 on the captured image 300. Here, the image processing unit 140 may perform the image processing, such as the resolution and/or compression rate controlling, high frequency component removing and image quality enhancing, etc., on the portion of the image within at least one of the image capturing designation range and the ideal composition range and the other portion of the image outside of either of the image capturing designation range or the ideal composition range, respectively. For example, the image processing unit 140 may convert the portion of the image outside of either of the image capturing designation range 310 or the ideal composition range 320 into an image of lower resolution than that of the portion of the image within at least one of the image capturing designation range 310 and the ideal composition range 320.

According to the image capturing apparatus of the present embodiment, it is possible to store an image of a better quality in resulution and/or compression rate in the ideal composition range as well as in the image capturing designation range designated by the user. According to this, the user can have a high quality image by performing an editing operation, such as a trimming operation, on the captured image when the user feels that the user should have captured a better image if the image was in another composition even after the image has been captured.

Figure 4:
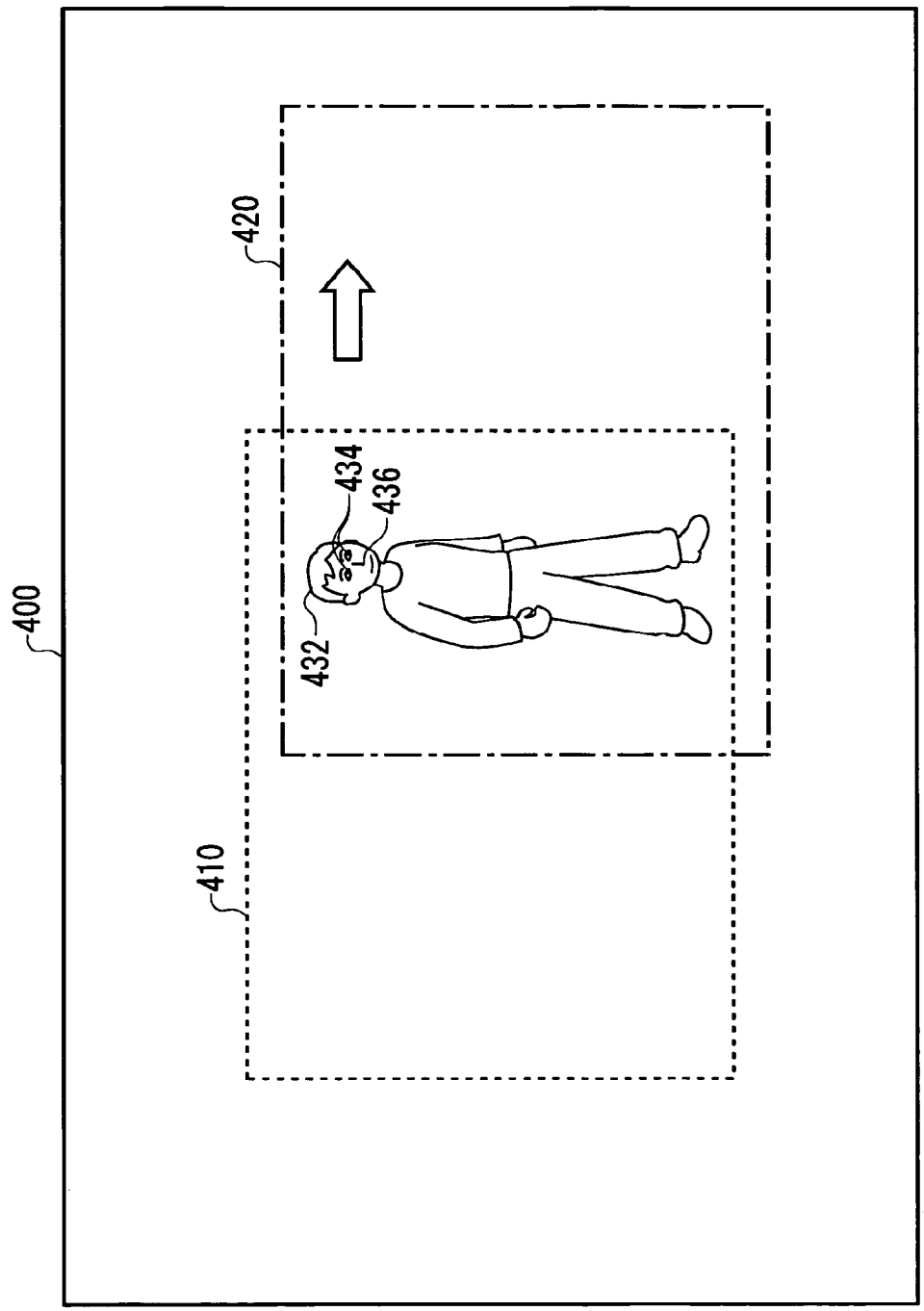
FIG. 4 shows an image for illustrating a method for detecting the ideal composition range on the basis of a facing direction of a person in the captured image according to the present embodiment by the ideal composition range detecting unit 130.

FIG. 4 shows an image for illustrating a method for detecting the ideal composition range on the basis of a facing direction of a person in the captured image according to the present embodiment by the ideal composition range detecting unit 130. According to the present embodiment, the object in the captured image may be a human, and the ideal composition range detecting unit 130 may identify the facing direction of the person in the captured image. The ideal composition range detecting unit 130 may identify the facing direction of the face of the person in the captured image. The ideal composition range detecting unit 130 extracts the image portion of the person in the captured image. The ideal composition range detecting unit 130 may extract the vertically symmetrical area of the image of the person by performing, for example, a blurring processing and the matching processing on the extracted image of the person. The ideal composition range detecting unit 130 may identify the facing direction of the person in the captured image on the basis of the concentration of the position of the portion other than the front face of the person in the captured image.

The ideal composition range detecting unit 130 extracts the area of the face of the person out of each extracted object by the image processing, such as determining an area matched with a template facial image of various positions, sizes or rotated angles, etc. or extracting skin color. The ideal composition range detecting unit 130 may extract a vertically symmetrical area of the face of the person by performing, for example, the blurring processing on the contour of the extracted face of the person and then the matching processing. The ideal composition range detecting unit 130 may identify the facing direction of the face of the person in the captured image on the basis of the area occupied by the portions other than the front face of the person. For example, in case the vertically symmetrical area of the face of the person occupies the right side of the face, the facing direction of the face of the person may be identified as the right direction.

The ideal composition range detecting unit 130 may store data of a facial image of a person in advance. The ideal composition range detecting unit 130 performs a pattern matching on a plurality of portions of facial images of the extracted images of the persons in the captured image with the facial image data stored in advance in the ideal composition range detecting unit 130. The ideal composition range detecting unit 130 extracts a portion of a face of a person. The ideal composition range detecting unit 130 identifies the facing direction of the face of the person in the captured image on the basis of the plurality of portions in the extracted facial area. The ideal composition range detecting unit 130 may identify the facing direction of the person 432 in the captured image 400 as the direction of the eyes 434, the right direction, in case, for example, the eyes 434 extracted from the face of the person 432 are concentrated in the right side of the face. The ideal composition range detecting unit 130 may identify the facing direction of the face of the person in the captured image as the direction of the end of the nose 436 by detecting the direction of the end of the nose 436 in case the nose 436 is extracted from the face of the person 432, for another example. In the above example, since the end of the nose 436 of the person 432 faces to the right direction in the captured image 400, the facing direction of the person 432 in the captured image 400 may be identified as the right direction.

The ideal composition range detecting unit 130 may identify a facing direction of the body of the person as a direction perpendicular to the shoulder of the person. It is also possible to determine the facing direction of the body is the facing direction of the person in the captured image. The direction of the person can be identified as described hereinafter, for example. First, the ideal composition range detecting unit 130 extracts the face of the person. Then, the ideal composition range detecting unit 130 recognizes the shoulder positioned below the extracted face of the person. Then, the ideal composition range detecting unit 130 identifies the facing direction of the shoulder on the basis of, for example, the front-rear relationship of the upper arms of both arms in the captured image. For example, in case the area ratio of the right arm to the are of the captured image is higher than that of the left arm, it is possible to determine the right arm is in front of the left arm. In other words, it is possible to determine that the facing direction of the shoulder in the captured image is the left direction. In this case, the facing direction of the body of the person in the captured image is the right direction perpendicular to the direction of the shoulder.

Here, in case the facing directions of the face and the body of the person identified by the ideal composition range detecting unit 130 are the same, the facing direction of the person in the captured image is identified as the identified direction of the face or the body of the person. On the other hand, in case the facing direction of the face of the person identified by the ideal composition range detecting unit 130 and the facing direction of the body of the person identified by the ideal composition range detecting unit 130 on the basis of the facing direction of the shoulder of the person are not the same, the facing direction of the person in the captured image may be identified as described hereinafter. For example, even though the identified direction of the face is the front direction of the captured image, in case the facing direction of the body in the captured image is not the front direction, the facing direction of the person in the captured image is identified as the facing direction of the body of the person. On the other hand, even though the identified direction of the face is not in the front direction of the captured image, in case the identified direction of the body is in the front direction of the captured image, the facing direction of the person in the captured image is identified as the facing direction of the face of the person.

The ideal composition range detecting unit 130 may determine a composition in which a blank space is located in the facing direction of the face of the extracted person as the ideal composition. The ideal composition range detecting unit 130 may detect the ideal composition range 420 indicating the ideal composition. By this, the storing unit of the image capturing apparatus 10 may store the information indicating the image capturing designation range 410 and the ideal composition range 420 for the captured image 400.

Figure 5:
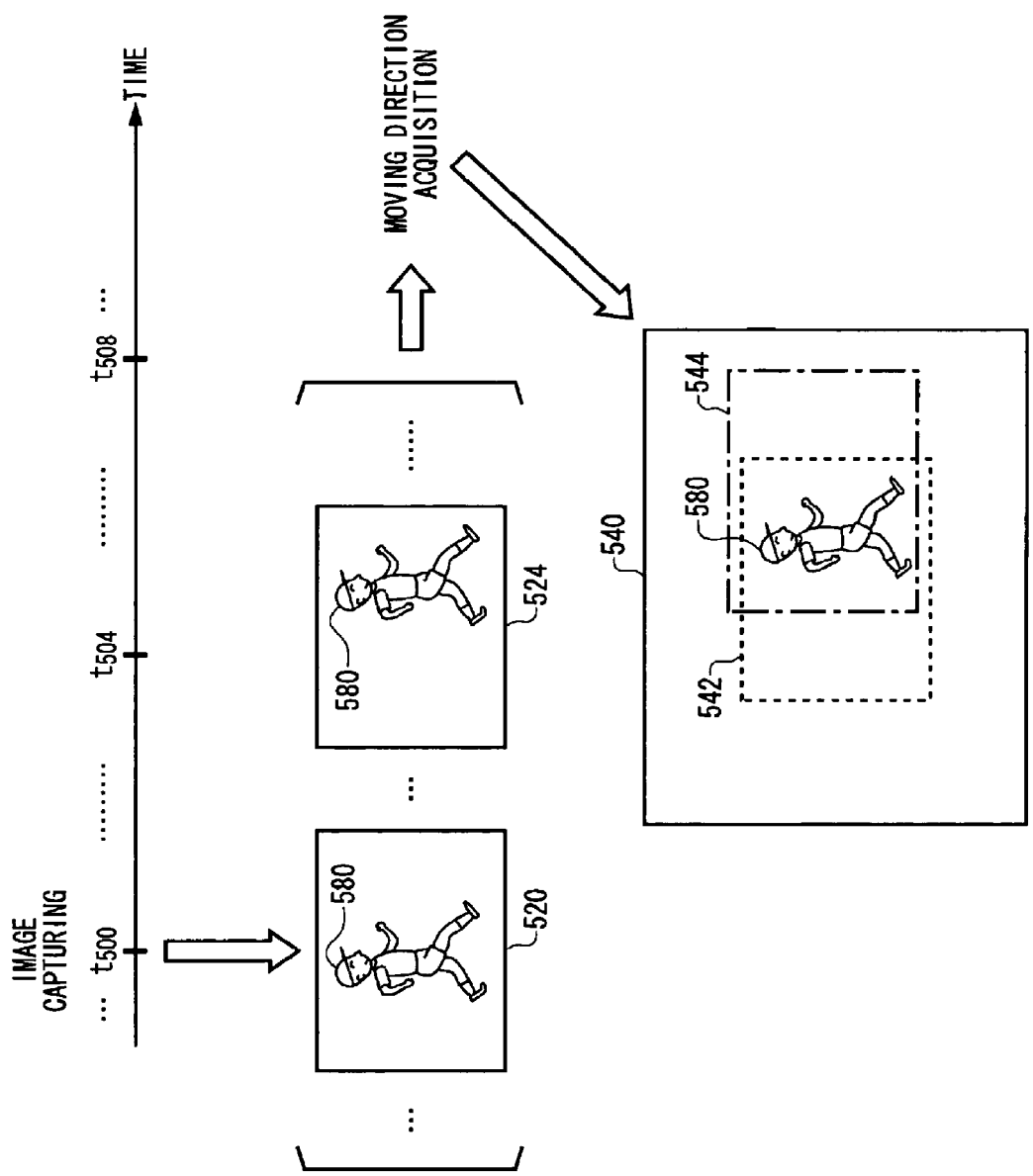
FIG. 5 shows images for illustrating a method for detecting the ideal composition range on the basis of a moving direction of an object in the captured image according to the present embodiment by the ideal composition detecting unit 130.

FIG. 5 shows images for illustrating a method for detecting the ideal composition range on the basis of a moving direction of an object in the captured image according to the present embodiment by the ideal composition detecting unit 130. The ideal composition detecting unit 130 detects positions of the same object in frame images 520 and 524 captured at times t500 and t504, respectively. Specifically, the ideal composition range detecting unit 130 extracts contours of the object 580 in the frame images 520 and 524 captured at the times t500 and t504, respectively, by the image processing, such as edge extraction, etc. The ideal composition range detecting unit 130 detects positions of the same object 580 in the frame images at times t500 and t504 by performing, for example, the pattern matching between the extracted contours.

The ideal composition range detecting unit 130 acquires a moving direction, a direction in which the object 580 is moving, on the basis of the positions of the object 580 in the frames at times t500 and t504 and the frame period. Then, the ideal composition range detecting unit 130 compares the size of a background area in the moving direction of the object 580 in the image capturing designation range 542 of the captured image 540 with the size of the background area in the reverse direction of the moving direction of the object 580 in the captured image 540. The ideal composition range detecting unit 130 detects the ideal composition range 544 in order that the background area in the moving direction of the object 580 in the captured image 540 is wider than the background area in the reverse direction of the moving direction of the object 580 in the captured image 540.

Figure 6:
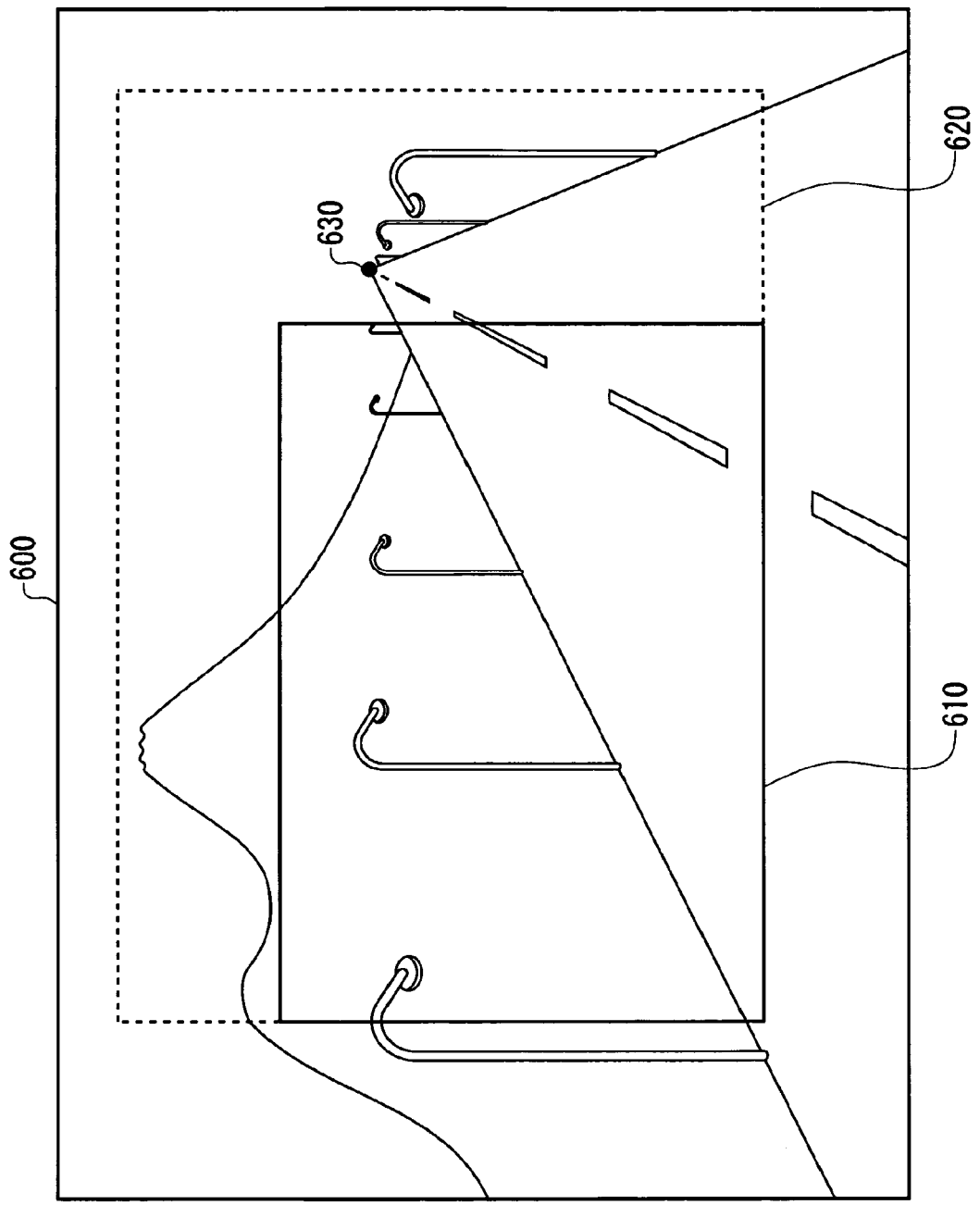
FIG. 6 shows an example of a method for detecting an ideal composition range on the basis of a vanishing point by using the ideal composition range detecting unit 130 according to the present embodiment.

FIG. 6 shows an example of a method for detecting an ideal composition range on the basis of a vanishing point by using the ideal composition range detecting unit 130 according to the present embodiment. The ideal composition range detecting unit 130 acquires a direction component of a captured image 600 by performing an image processing such as an edge extraction processing, a line thinning processing, etc. on the captured image 600. Further, the ideal composition range detecting unit 130 acquires a vanishing point 630 on which the acquired direction component is focused. Then, the ideal composition range detecting unit 130 detects an ideal composition range 620 including at least a part of an image capturing designation range 610 and the position of the acquired vanishing point 630. The ideal composition range detecting unit 130 may detect an area acquired by expanding the image capturing designation range 610 to comprise the vanishing point 630 in the direction to the vanishing point 630 as the ideal composition range 620 in case the vanishing point 630 is outside of the image capturing designation range 610. In a related case, the ideal composition range detecting unit 130 may detect the ideal composition range 620 by expanding the image capturing designation range 610 so that the aspect ratio of the ideal composition range 620 can be substantially the same as that of the image capturing designation range 610. Further, the ideal composition range detecting unit 130 may expand or reduce the area of the image capturing designation range 610 by lengthening or shortening the longer side or the shorter side of the image capturing designation range 610 to detect the ideal composition range 620 comprising the vanishing point. For example, the ideal composition range detecting unit 130 may detect the ideal composition range 620 comprising the vanishing point by shortening the longer side and lengthening the shorter side of the image capturing designation range 610.

Figure 7:
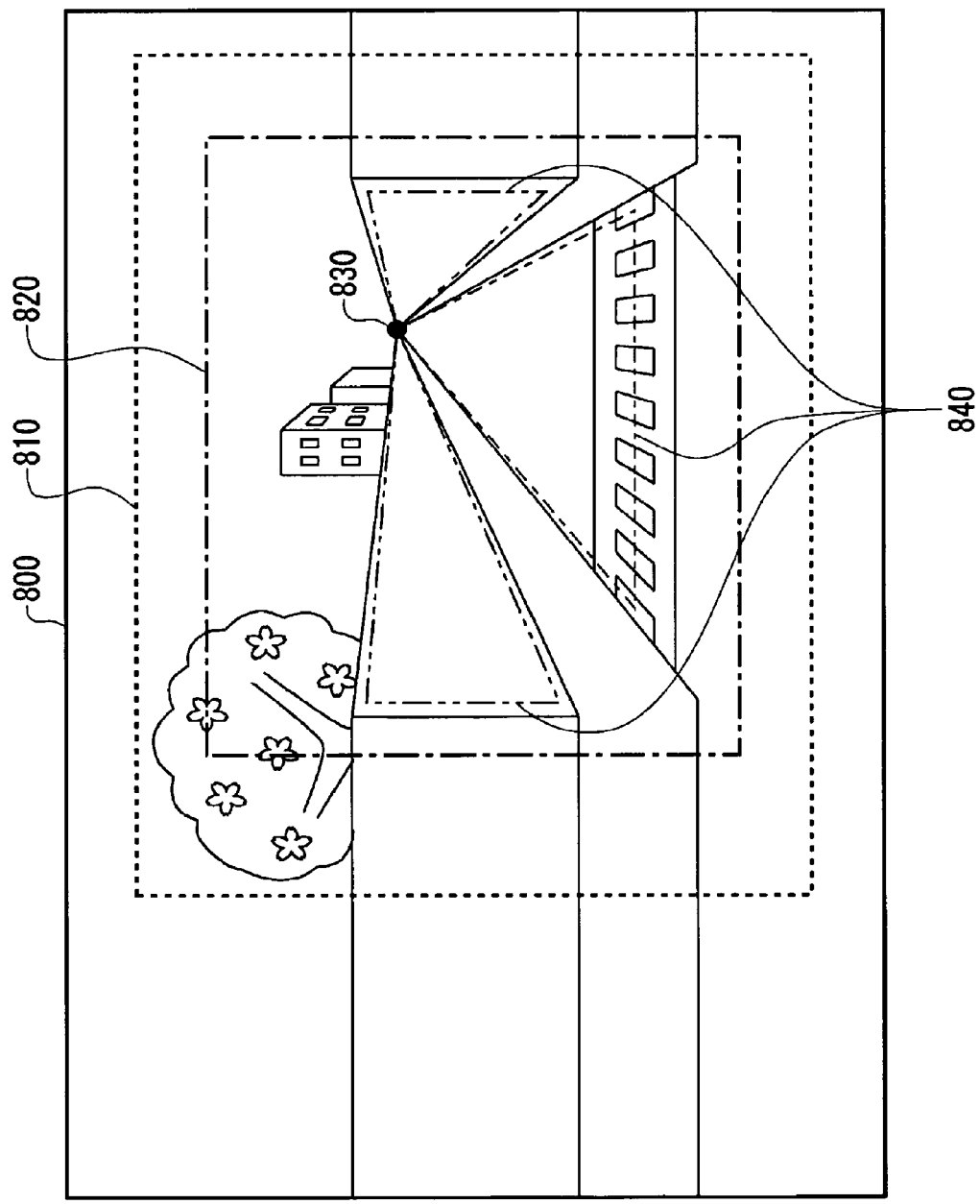
FIG. 7 shows an example of a method for detecting an ideal composition range on the basis of a vanishing point by using the ideal composition range detecting unit 130 according to the present embodiment.

FIG. 7 shows an example of a method for detecting an ideal composition range on the basis of a vanishing point by using the ideal composition range detecting unit 130 according to the present embodiment. The ideal composition range detecting unit 130 acquires a direction component of a captured image 800 by performing an image processing such as an edge extraction processing, a line thinning processing, etc. on the captured image 800. Further, the ideal composition range detecting unit 130 acquires a vanishing point 830 on which the acquired direction component is focused. The ideal composition range detecting unit 130 detects a triangular partial area 840 formed by the contour of an object, which has the vanishing point as one of it's apex, in case the vanishing point 830 is outside of the image capturing designation range 810. Further, the ideal composition range detecting unit 130 detects a portion of the image capturing designation range 810 to comprise the detected triangular partial area 840. In addition, the number of the triangular partial area(s) 840 formed by formed by the contour of an object may be one or a plural number for the captured image 800.

Figure 8:
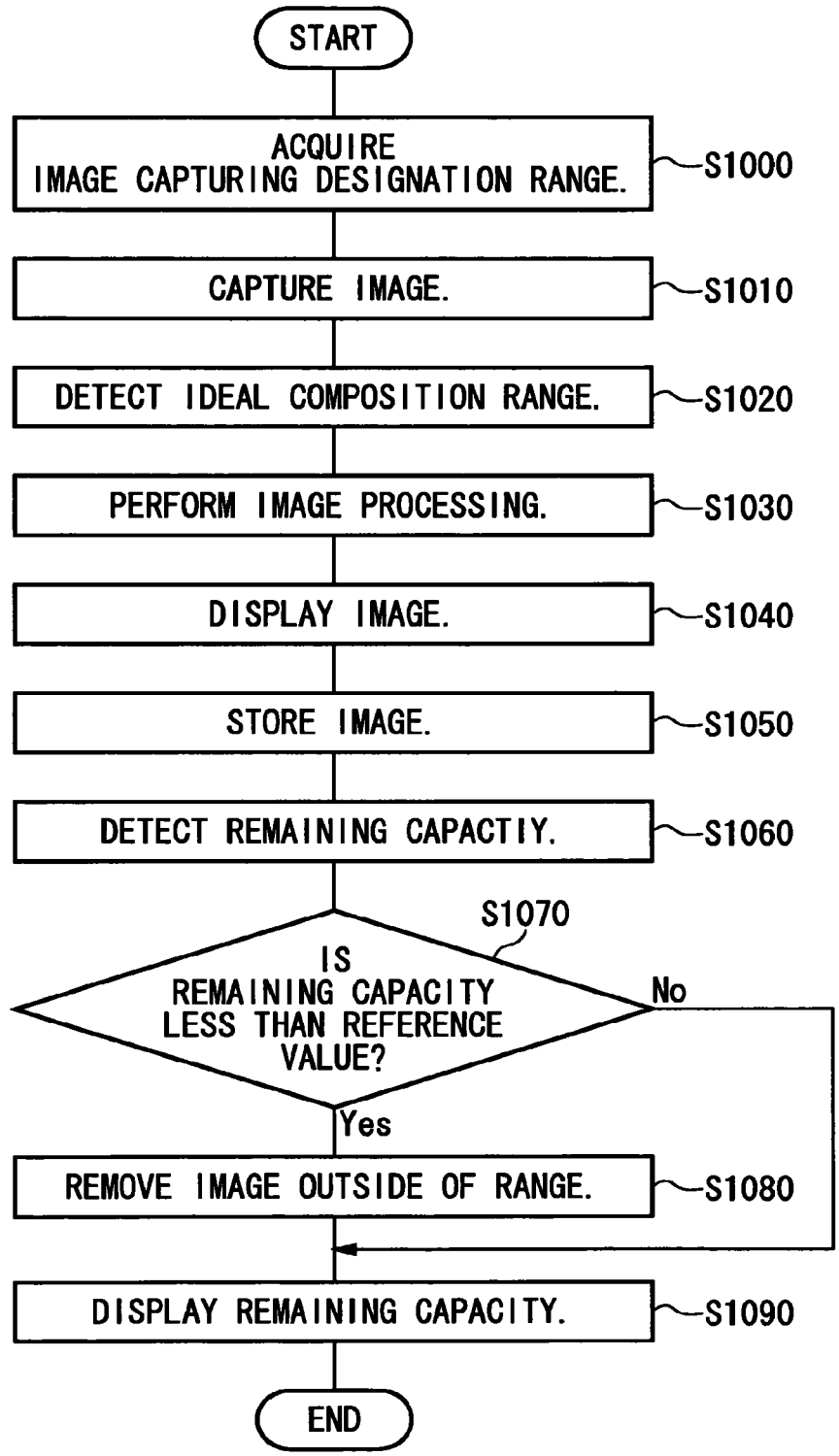
FIG. 8 shows an example of a process flow of the image capturing apparatus 10 according to the embodiment of the present invention.

FIG. 8 shows an example of a process flow of the image capturing apparatus 10 according to the embodiment of the present invention. First, the image capturing designation range acquiring unit 100 acquires an image capturing designation range, which is a range in which the user designates to capture an image, in case of being instructed of capturing the image, for example, by pressing a release button (S1000). For example, the image capturing designation range acquiring unit 100 may acquire a range displayed on an electronic view finder which is the displaying unit 180 by the user's manual adjustment of a zooming ratio as the image capturing designation range. Then, the image capturing unit 110 captures an image of a range wider than the image capturing designation range (S1010).

Then, the ideal composition range detecting unit 130 detects an ideal composition range in which the captured image is ideally composed from the captured image (S1020). Then, the image processing unit 140 performs an image processing on the captured image on the basis of the image capturing designation range and the ideal composition range (S1030). Specifically, the image processing unit 140 may perform an image processing on the captured image to make the amount of data of a portion of the captured image outside of either of the image capturing designation range or the ideal composition range to be less than that of the portion of the image within at least one of the image capturing designation range and the ideal composition range. Here, the image processing unit 140 may confirm whether the image processing is to be performed to the user before performing the image processing on the captured image. Further, the image processing unit 140 may confirm whether or not the image processing is to be performed to the user only if it is previously instructed of requiring the user's confirmation in which case such the image capturing apparatus 10 is validly set to a confirmation mode. Furthermore, in case of requiring the user's confirmation on whether or not the image processing is to be performed, the image processing unit 140 may display images of a portion of the image which is more largely than the other part before and after the processing by using the displaying unit 182 so that the user can compare them, for example, by dividing a screen to display them simultaneously or making them displayed switchably. Then, the image displaying unit 140 displays at least an image within the image capturing designation range out of the captured image by making the user recognize the image capturing designation range (S1040). For example, the image displaying unit 182 may display only the image capturing designation range out of the captured image, or an image of a range wider than the image capturing designation range with a frame showing the image capturing designation range overlapped. Then, the second memory 150 stores information respectively indicating the image capturing designation range and the ideal composition range corresponding to the captured image (S1050).

Then, the remaining capacity detecting unit 160 detects the remaining capacity of the second memory 150 (S1060). Here, the remaining capacity may be a byte unit value of the data amount on which additional writing is possible or a value showing the number of captured images which can be additionally written for resolution and color depth of a current image capturing mode of the image capturing apparatus 10, that is, a value obtained by dividing the data amount on which additional writing is possible by an average data amount per image for the image capturing mode. Then, the image removing unit 170 judges whether or not the remaining capacity of the second memory 150 is less than a predetermined reference value (S1070). Here, the predetermined reference value may be a byte unit value showing the data amount or the number of images captured by using the current image capturing mode of the image capturing apparatus 10.

Further, in case it is judged that the remaining capacity of the second memory 150 is less than a predetermined reference value (S1070: Yes), the image removing unit 170 removes the portion of the image outside of either of the image capturing designation range or the ideal composition range out of the captured image stored in the second memory 150 (S1080). Thus, even in case an image outside of either of the image capturing designation range and the ideal composition range is stored, it is possible for the user to use efficiently memory capacity of the second memory 150 without reducing the number of images which can be captured by the image capturing apparatus 10. Further, the image removing unit 170 may remove a portion of the image which is inside of the ideal composition range but outside of the image capturing designation range as well as a portion of the image outside of the image capturing designation range and the ideal composition range. In addition, in case of performing a processing of removing a partial image included in the captured image as above, the image capturing apparatus 10 may confirm whether or not the processing is to be performed to the user as similar with S1030 in which the image processing unit 140 performs an image processing. Further, in case of performing the processing automatically, the image capturing apparatus 10 may inform the user of that, for example, by displaying on the displaying unit 182.

Then, the remaining capacity displaying unit 184 displays a capacity calculated by adding the remaining capacity of the second memory 150 detected by the remaining capacity detecting unit 160 to the capacity occupied by the portion of the image outside of the image capturing designation range and the ideal composition range corresponding to that captured image stored in the second memory 150, as a remaining capacity of the second memory 150 (S1090). Here, the remaining capacity displaying unit 184 may display a byte unit value of the data amount on which additional writing is possible or a value showing the number of captured images which can be additionally written for a current image capturing mode of the image capturing apparatus 10 as the remaining capacity of the second memory 150. Further, the remaining capacity displaying unit 184 may display a capacity calculated by adding a capacity occupied by the portion which is inside the ideal composition range but outside of the image capturing designation range as well as the portion of the image outside of the image capturing designation range and the ideal composition range to the detected remaining capacity.

In case of displaying the capacity detected by the remaining capacity detecting unit 160 without any retouch, a remaining capacity smaller than that in case of storing images inside the image capturing designation range is displayed since image(s) outside of the image capturing designation range is(are) stored in the second memory 150. However, since the image removing unit 170 removes image(s) outside of the image capturing designation range when the remaining memory of the second memory 150 is reduced, the image capturing apparatus 10 should display a remaining capacity substantially the same as that in case of storing only images inside of the image capturing designation range. According to the image capturing apparatus 10 of the embodiment of the present invention, the remaining capacity displaying unit 184 displays a remaining capacity calculated by adding a capacity occupied by an image outside of the image capturing resignation region to the detected remaining capacity and thus it is possible to display a remaining capacity substantially the same as that in case of storing only images inside of the image capturing designation range even in case of storing images outside of the image capturing designation range.

Figure 9:
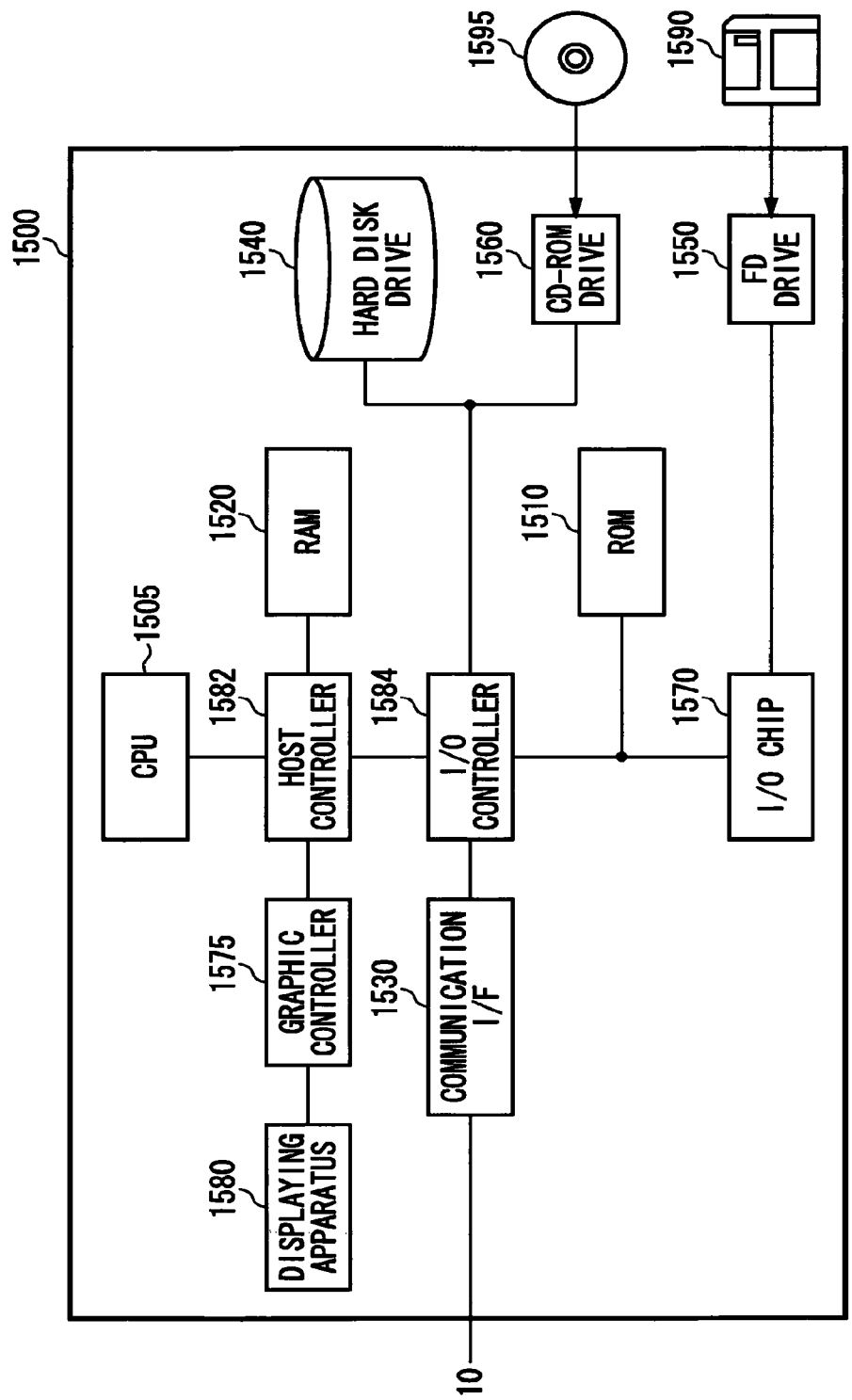
FIG. 9 is a block diagram showing an example of a hardware configuration of a computer 1500 according to the embodiment of the present invention.

FIG. 9 is a block diagram showing an example of a hardware configuration of a computer 1500 according to the embodiment of the present invention. The computer 1500 according to the embodiment of the present invention includes a CPU peripheral part comprising a CPU 1505, a RAM 1520, a graphic controller 1575, and a displaying apparatus 1580 which are connected with each other by a host controller 1582, an input and output part comprising a communication interface 1530 connected to the host controller 1582 by an input and output controller 1584 ("I/O controller 1584"), a hard disk drive 1540, and a CD-ROM drive 1560, and a legacy input and output part comprising a ROM 1510 connected to the I/O controller 1584, a flexible disk drive 1550, and an input and output chip 1570 ("I/O chip 1570").

The host controller 1582 connects the RAM 1520 with the CPU 1505 having access to the RAM 1520 at a high transmission rate and the graphic controller 1575. The CPU 1505 operates and performs control of each part on the basis of programs stored in the ROM 1510 and the RAM 1520. The graphic controller 1575 acquires image data which is generated on a frame buffer provided in the RAM 1520 by the CPU 1505, etc. and displays it on the displaying apparatus 1580. Instead, the graphic controller 1575 may include a frame buffer storing an image data generated by the CPU 1505, etc. therein.

The I/O controller 1584 connects the host controller 1582 with the hard disk drive 1540, which is a relatively high-speed I/O apparatus, the communication interface 1530, and the CD-ROM drive 1560. The hard disk drive 1540 stores a program and data to be used by the CPU 1505 in the computer 1500. The communication interface 1530 communicates with the image capturing apparatus 10 via a network and provides the image capturing apparatus 10 with a program and data. The CD-ROM drive 1560 retrieves a program or data from a CD-ROM 1595 and provides the hard disk drive 1540 and the communication interface 1530 with it via the RAM 1520.

Further, the I/O controller 1584 is connected with the ROM 1510 and a relatively low-speed I/O apparatus such as the flexible disk drive 1550 and the I/O chip 1570. The ROM 1510 stores a boot program executed by the CPU 1500 when the computer 1500 starts to operate, a program depending on the hardware of the computer 1500, and the like. The flexible disk drive 1550 retrieves a program or data from a flexible disk 1590 and provides the hard disk drive 1540 and the communication interface 1530 with it via the RAM 1520. The I/O chip 1570 connects the flexible disk drive 1550 with various I/O apparatus via a parallel port, a serial port, a keyboard port, a mouse port, and the like.

The program provided to the communication interface 1530 via the RAM 1520 is stored in a recording medium such as the flexible disk 1590, the CD-ROM 1595, or an IC-card and provided by a user. The program is retrieved from the recording medium, provided to the communication interface 1530 via the RAM 1520, and sent to the image capturing apparatus 10 via the network. The program sent to the image capturing apparatus 10 is installed on the image capturing apparatus 10 to be executed. The program installed and executed on the image capturing apparatus 10 makes the image capturing apparatus 10 operate as the image capturing apparatus 10 described with respect to FIGS. 1 to 8.

The program described above may be stored in a recording medium of the outside. An optical recoding medium such as a DVD, a PD, etc., a magneto-optical recording medium such as an MD, a tape medium, and a semiconductor memory such as an IC card can be used as the recoding medium in addition to the flexible disk 1590 and the CD-ROM 1595. Further, a storing apparatus such as a hard disk or a RAM provided in a server system connected with a dedicated communication network and internet may be used as the recording medium and may provide the computer 1500 with the program through the network.

Although the present invention has been described by way of exemplary embodiments, it should be understood that those skilled in the art might make many changes and substitutions without departing from the spirit and the scope of the present invention which is defined only by the appended claims.

What is claimed is:

1. An image trimming method for trimming a captured image that has a range of capturing wider than an image capturing designation range, the method comprising:
   an image capturing designation range acquiring step for acquiring an image capturing designation range designated by a user;
   a vanishing point acquiring step for acquiring a position of a vanishing point in the captured image;
   an ideal composition range detecting step for detecting an ideal composition range which includes at least a portion of the image capturing designation range and the position of the vanishing point; and
   a trimming step for trimming off an image having the ideal composition range detected at the ideal composition range detecting step, out of the captured image, wherein the ideal composition range detecting step detects an area, as the ideal composition range, acquired by expanding the image capturing designation range to comprise the vanishing point in a direction to the vanishing point when the position of the vanishing point is located outside the image capturing designation range.

2. The image trimming method as claimed in claim 1, wherein the ideal composition range detecting step detects the ideal composition range by expanding the image capturing designation range so that an aspect ratio of the ideal composition range is substantially the same as an aspect ratio of the image capturing designation range.

3. The image trimming method as claimed in claim 1, wherein the ideal composition range detecting step detects the ideal composition range comprising the vanishing point by lengthening at least one set of sides of the image capturing designation range.

4. The image trimming method as claimed in claim 1, wherein the ideal composition range detecting step detects a portion of the image capturing designation range, as the ideal composition range, to comprise a triangular area formed by a contour of an object, which has the vanishing point as an apex of the triangular area, when the position of the vanishing point locates inside the image capturing designation range.

5. The image trimming method as claimed in claim 1, wherein the ideal composition range detecting step acquires a direction component of the captured image and acquires a point, as the vanishing point, on which the acquired direction component is focused.

* * * * *